US012167455B2

United States Patent
Shokri Razaghi et al.

(10) Patent No.: US 12,167,455 B2
(45) Date of Patent: Dec. 10, 2024

(54) DCI SIGNALLING INCLUDING AT LEAST ONE SLOT FORMAT INDICATOR, SFI, FIELD, AND A FREQUENCY RESOURCE INDICATOR FIELD

(71) Applicant: TELEFONAKTIEBOLAGET LM ERICSSON (PUBL), Stockholm (SE)

(72) Inventors: Hazhir Shokri Razaghi, Solna (SE); Min Wang, Lulea (SE); Reem Karaki, Aachen (DE); Stephen Grant, Pleasanton, CA (US); Iana Siomina, Taby (SE); Tai Do, Lund (SE); Yuhang Liu, Lund (SE); Havish Koorapaty, Saratoga, CA (US); Sorour Falahati, Stockholm (SE); Jung-Fu Cheng, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 353 days.

(21) Appl. No.: 17/635,807

(22) PCT Filed: Aug. 15, 2020

(86) PCT No.: PCT/IB2020/057705
§ 371 (c)(1),
(2) Date: Feb. 16, 2022

(87) PCT Pub. No.: WO2021/033119
PCT Pub. Date: Feb. 25, 2021

(65) Prior Publication Data
US 2022/0295560 A1 Sep. 15, 2022

Related U.S. Application Data

(60) Provisional application No. 62/888,215, filed on Aug. 16, 2019.

(51) Int. Cl.
*H04W 74/0816* (2024.01)
*H04W 72/0453* (2023.01)
(Continued)

(52) U.S. Cl.
CPC ... *H04W 74/0816* (2013.01); *H04W 72/0453* (2013.01); *H04W 74/006* (2013.01); *H04W 74/0866* (2013.01)

(58) Field of Classification Search
CPC ......... H04W 74/0816; H04W 72/0453; H04W 74/006; H04W 74/0866
See application file for complete search history.

(56) References Cited

U.S. PATENT DOCUMENTS

| 11,039,466 B2 * | 6/2021 | Xiong | H04L 5/0051 |
| 2020/0037245 A1 * | 1/2020 | Lu | H04W 72/23 |
| 2022/0124807 A1 * | 4/2022 | Hu | H04W 74/006 |

OTHER PUBLICATIONS

3GPP TS 37.213 V15.2.0 (Sep. 2019) 3rd Generation Partnership Project; Technical Specification Group Radio Access Network; Physical layer procedures for shared spectrum channel access (Release 15).

(Continued)

*Primary Examiner* — Michael A Keller
(74) *Attorney, Agent, or Firm* — Ericsson Inc.

(57) ABSTRACT

A wireless device (110) receives a frequency resource configuration (200) from an access node (120), the access node generates downlink control information DCI (201) and transmits a control message (202) including at least one slot format indicator, SFI, field and a frequency resource indicator field. Based on the frequency resource indicator, the wireless device determines whether a particular frequency resource is available for operation (203) and whether the wireless device can receive or transmit data on said frequency resource (204, 205).

34 Claims, 12 Drawing Sheets

(51) Int. Cl.
*H04W 74/00* (2009.01)
*H04W 74/08* (2009.01)

(56) References Cited

OTHER PUBLICATIONS

3GPP TS 38.213 V15.6.0, 3rd Generation Partnership Project; Technical Specification Group Radio Access Network; NR; Physical layer procedures for control (Release 15), Jun. 2019.

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.

3GPP, "3rd Generation Partnership Project; Technical Specification Group Radio Access Network; NR; Multiplexing and channel coding (Release 15)", TS 38.212 V15.5.0, Mar. 2019.

3GPP, Technical Specification 3rd Generation Partnership Project; Technical Specification Group Radio Access Network; NR; Radio Resource Control (RRC) protocol specification (Release 15), 3GPP TS 38.331 V15.6.0 (Jun. 2019) https://portal.3gpp.org/desktopmodules/Specifications/SpecificationDetails.aspx?specificationId=3197.

ETSI EN 301 893 V2.1.1 (May 2017), "5 GHz RLAN; Harmonised Standard covering the essential requirements of article 3.2 of Directive 2014/53/EU".

MCC Support, "Final Report of 3GPP TSG RAN WG1 #96b v1.0.0 (Xi'an, China, Apr. 8-12, 2019)", R1-1905921, 3GPP TSG RAN WG1 Meeting #97, Reno, USA, May 13-17, 2019.

SHARP—3GPP TSG RAN WG1 Meeting No. 97-R1-1907210—Downlink structure and procedure for NR-U operation.

International Search Report for PCT/IB2020/057705, mailing date of Dec. 7, 2020.

\* cited by examiner

DCI SIGNALLING INCLUDING AT LEAST ONE SLOT FORMAT INDICATOR, SFI, FIELD, AND A FREQUENCY RESOURCE INDICATOR FIELD

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz).

Similar to LTE, NR uses OFDM (Orthogonal Frequency Division Multiplexing) in the downlink (i.e. from a network node, gNB, eNB, or base station, to a user equipment or UE). In the uplink (i.e. from UE to gNB), both DFT-spread OFDM and OFDM can be supported.

The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^\alpha)$ kHz where $\alpha \in (0,1,2,3,4)$. $\Delta f=15$ kHz is the basic (or reference) subcarrier spacing that is also used in LTE.

In the time domain, downlink and uplink transmissions in NR will be organized into equally-sized subframes of 1 ms each, similar to LTE. A subframe can be further divided into multiple slots of equal duration. The slot length for subcarrier spacing $\Delta f=(15\times 2^\alpha)$ kHz is $\frac{1}{2}^\alpha$ ms. There is only one slot per subframe for $\Delta f=15$ kHz and a slot consists of 14 OFDM symbols.

Downlink (DL) transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Downlink Control Channel (PDCCH) and the data is carried on the Physical Downlink Shared Channel (PDSCH). A UE first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including SSB, CSI-RS, etc.

Uplink (UL) data transmissions, carried on Physical Uplink Shared Channel (PUSCH), are also dynamically scheduled by the gNB by transmitting a DCI. The DCI, which is transmitted in the DL region, always indicates a scheduling offset so that the PUSCH is transmitted in a slot in the UL region.

In NR, both semi-statically configured time division duplex (TDD) and dynamic TDD are supported. For the latter, the scheduling DCI (e.g. DL assignment/UL grant) indicates which symbols within a slot are to be used for DL reception and UL transmission by the UE.

For semi-static TDD, the configuration of uplink-downlink patterns is flexible. For a particular slot within the TDD pattern, symbols may be configured as either downlink (denoted 'D'), uplink (denoted 'U'), or flexible (denoted 'F'). One use of symbols classified as 'F' is to create a guard period for DL-to UL or UL-DL transitions for half-duplex devices (e.g. half-duplex FDD or TDD). A cell specific TDD pattern is either provided by system information block (SIB) (standalone operation) or by radio resource control (RRC) (non-standalone operation) signaling. Additionally, a UE-specific TDD pattern can be configured to override symbols of the cell-specific configuration which are classified as flexible ('F').

For dynamic TDD where the UL/DL allocation may vary depending on the scheduling DCI, it can be useful to indicate to a group of UEs what the instantaneous TDD pattern looks like for the current and potentially future slots. This is achieved through group common signaling (GC-PDCCH) carrying a DCI message with Format 2_0. DCI Format 2_0 contains one or more Slot Format Indicators (SFI) indicating which symbols are classified as 'D', 'U', or 'F' within each of the indicated slots.

Semi-Static Uplink-Downlink Configuration

Cell-specific semi-static configuration of the TDD pattern(s) is provided from the network to the UE by the information element (IE) TDD-UL-DL-ConfigCommon, as described in 3GPP TS 38.331 "Radio Resource Control (RRC) Protocol Specification":

```
TDD-UL-DL-ConfigCommon ::=          SEQUENCE {
    referenceSubcarrierSpacing          SubcarrierSpacing,
    pattern1                            TDD-UL-DL-Pattern,
    pattern2                            TDD-UL-DL-Pattern
    OPTIONAL, -- Need R
    ...
}
TDD-UL-DL-Pattern ::=               SEQUENCE {
    dl-UL-TransmissionPeriodicity       ENUMERATED {ms0p5, ms0p625, ms1,
    ms1p25, ms2, ms2p5, ms5, ms10},
    nrofDownlinkSlots                   INTEGER (0..maxNrofSlots),
```

| | |
|---|---|
| nrofDownlinkSymbols | INTEGER (0..maxNrofSymbols-1), |
| nrofUplinkSlots | INTEGER (0..maxNrofSlots), |
| nrofUplinkSymbols | INTEGER (0..maxNrofSymbols-1), |
| ..., | |
| [[ | |
| dl-UL-TransmissionPeriodicity-v1530 | ENUMERATED {ms3, ms4} |
| OPTIONAL -- Need R | |
| ]] | |
| } | |

This IE provides the option to provide up to two concatenated TDD patterns (pattern1, pattern2) each with their own periodicity. There is a constraint that the concatenated pattern must have a total periodicity that divides 20 ms evenly in order to align with the default SS/PBCH block periodicity of 20 ms assumed by the UE upon accessing a cell i.e. devices that are doing initial cell search or devices in inactive/idle state doing cell search for mobility.

For each of the one or two concatenated patterns, the above IE defines the TDD pattern as follows:

Number of full DL slots, where all symbols of these slots are classified as 'D' by nrofDownlinkSlots.

Number of symbols classified as 'D' in a partial DL slot following the last full DL slot by nrofDownlinkSymbols.

Number of symbols classified as 'U' in a partial UL slot preceding the first full UL by nrofUplinkSymbols.

Number of full UL slots, where all symbols of these slots are classified as 'U' by nrofUplinkSlots.

Periodicity, in ms, after which the pattern repeats by dl-UL-TransmissionPeriodicity.

All symbols not classified as either 'D' or 'U' are assumed to be classified as 'F'.

FIG. 2 illustrates some example cell-specific TDD patterns that can be configured semi-statically by the TDD-UL-DL-ConfigCommon IE.

As mentioned, an individual UE can be semi-statically configured with a UE-specific TDD pattern that overrides parts of the cell-specifically configured pattern. UE-specific semi-static configuration of a TDD pattern is provided from the network to the UE by the information element TDD-UL-DL-ConfigDedicated:

| | |
|---|---|
| TDD-UL-DL-ConfigDedicated ::= | SEQUENCE { |
| slotSpecificConfigurationsToAddModList | SEQUENCE (SIZE |
| (1..maxNrofSlots)) OF TDD-UL-DL-SlotConfig | OPTIONAL, -- Need N |
| slotSpecificConfigurationsToreleaseList | SEQUENCE (SIZE |
| (1..maxNrofSlots)) OF TDD-UL-DL-SlotIndex | OPTIONAL, -- Need N |
| ... | |
| } | |
| TDD-UL-DL-SlotConfig ::= | SEQUENCE { |
| slotIndex | TDD-UL-DL-SlotIndex, |
| symbols | CHOICE { |
| allDownlink | NULL, |
| allUplink | NULL, |
| explicit | SEQUENCE { |
| nrofDownlinkSymbols | INTEGER (1..maxNrofSymbols-1) |
| OPTIONAL, -- Need S | |
| nrofUplinkSymbols | INTEGER (1..maxNrofSymbols-1) |
| OPTIONAL -- Need S | |
| } | |
| } | |
| } | |
| TDD-UL-DL-SlotIndex ::= | INTEGER (0..maxNrofSlots-1) |

This IE contains a list of slots within the cell specific TDD pattern for which the symbol classification should be overridden. However, this override can only be applied to symbols classified as flexible ('F'). For each indicated slot, the flexible symbols can be re-classified as 'allDownlink', 'allUplink', or 'explicit'. For 'explicit', the number of symbols at the beginning of the slot classified as 'D' is configured, and the number of symbols at the end of the slot classified as 'U' is configured.

Dynamic Indication of Uplink-Downlink Configuration by DCI Format 2_0

As mentioned, in the case of dynamic TDD where the UL/DL allocation may vary depending on the scheduling DCI, it can be useful to indicate to a group of UEs what the instantaneous TDD pattern looks like for the current and potentially future slots. This is achieved by signaling of one or more slot format indicators (SFI) in DCI Format 2_0 carried by the group common control channel (GC-PDCCH). Each SFI indicates which symbols in a slot are classified as 'D', 'U', or 'F'. The indicated SFI(s) cannot override symbols that are already semi-statically configured as 'D' or 'U'; however, an SFI can indicate the direction ('D' or 'U') for symbols classified as flexible ('F'). If the SFI indicates 'F' for symbols already classified as 'F', and PDCCH does not schedule any data or trigger reference signals in those symbols, then the UE shall neither transmit nor receive on those symbols. This can be useful to cancel an instance of a periodically transmitted/received reference signals (e.g. SRS, CSI-RS) to create "reserved resources" for use by another technology, e.g., LTE. It can also be useful to create reserved resources (e.g. no transmission or reception by any UE) in the case that the SFI indicates 'F' for a symbol that is already semi-statically configured.

In NR, a semi-static/static indication of direction of transmission is not a viable option since the transmission from gNB depends on the Listen-Before-Talk (LBT) outcome and the gNB does not know when it can acquire the channel. The transmission direction would be decided on the spot and according to LBT success occasion. Thus, all the symbols can be considered as F before the channel is captured.

As mentioned in Release 15, SFI is carried by DCI format 2_0 containing the following information is transmitted as described in 3GPP TS 38.212 "Multiplexing and channel coding" clause 7.3.1.3.1:

Slot format indicator 1, Slot format indicator 2, . . . , Slot format indicator N.

The size of DCI format 2_0 is configured by higher layer parameter up to 128 bits.

Further, as described in 3GPP TS 38.213, "Physical Layer Procedures for Control" clause 11.1.1., each "Slot format indicator" or "SFI index" field in DCI format 2_0 indicates to a group of UEs a "slot format" of each slot for a period of transmission in each DL or UL bandwidth part (BWP) or UL BWP, starting from the slot where UEs detect PDSCH carrying the DCI format 2_0. This clause applies a set of serving cells configured by higher layer parameter SlotFormatIndicator:

```
-- ASN1START
-- TAG-SLOTFORMATINDICATOR-START
SlotFormatIndicator ::=        SEQUENCE {
    sfi-RNTI                   RNTI-Value,
    dci-PayloadSize            INTEGER
                               (1..maxSFI-DCI-PayloadSize),
    slotFormatCombToAddModList SEQUENCE
(SIZE(1..maxNrofAggregatedCellsPerCellGroup)) OF
SlotFormatCombinationsPerCell
OPTIONAL, -- Need N
    slotFormatCombToReleaseList     SEQUENCE
(SIZE(1..maxNrofAggregatedCellsPerCellGroup)) OF ServCellIndex
OPTIONAL, -- Need N
    . . .
}
-- TAG-SLOTFORMATINDICATOR-STOP
-- ASN1STOP
```

As shown in the above IE, the UE is provided with sfi-RNTI and the payload size of DCI format 2_0 by dci-payloadSize.

Further, for each serving cell in the set of serving cells indicated in SlotFormatIndicator, the UE is provided with slotFormatCombinationsPerCell which configures the parameters used for interpretation of each SFI-index field for the corresponding serving cell.

```
-- ASN1START
-- TAG-SLOTFORMATCOMBINATIONSPERCELL-START
SlotFormatCombinationsPerCell ::=    SEQUENCE {
    servingCellId                    ServCellIndex,
    subcarrierSpacing                SubcarrierSpacing,
    subcarrierSpacing2               SubcarrierSpacing
OPTIONAL, -- Need R
    slotFormatCombinations           SEQUENCE (SIZE
(1..maxNrofSlotFormatCombinationsPerSet)) OF SlotFormatCombination
OPTIONAL, -- Need M
    positionInDCI                    INTEGER
                                     (0..maxSFI-DCI-PayloadSize-1)
OPTIONAL, -- Need M
    . . .
}
SlotFormatCombination ::=            SEQUENCE {
    slotFormatCombinationId          SlotFormatCombinationId,
    slotFormats                      SEQUENCE (SIZE
(1..maxNrofSlotFormatsPerCombination)) OF INTEGER (0..255)
}
SlotFormatCombinationId ::=          INTEGER
(0..maxNrofSlotFormatCombinationsPerSet-1)
-- TAG-SLOTFORMATCOMBINATIONSPERCELL-STOP
-- ASN1STOP
```

According to above IE, the following parameters are configured for each serving cell using the SlotFormatCombinationsPerCell:

An identity of the serving cell by servingCellID.

The location of SFI-index field in the DCI (i.e. "slot format indicator x" in DCI format 2_0) by positionInDCI for corresponding servingCellID.

A set of slot format combinations by slotFormatCombinations which comprise a sequence of SlotFormatCombinations. This can be interpreted as hash table where each "key" here indicated by SlotFormatCombinationID referring to a specific "slotFormatCombination" in the table, and each SlotFormatCombination itself includes two parameters:

(1) One or more slot formats (configured by maxNrofSlotFormatCombinationsPerSet which could be up to 256 slots) indicated by slotFormats.

(2) The slotFormats comprise of sequence of indices from 0, . . . , 256. Each index refers to a slot format in the table 11.1.1-1 in clause 11.1.1. in 3GPP TS 38.213 as will be explained below.

A mapping for the slot format combination provided by slotFormats to a corresponding SFI-index field value in DCI format 2_0 provided by the slotFormatCombinationID.

Table 11.1.1-1 below from 3GPP TS 38.213 contains a list of possible slot formats. An SFI is simply an integer that takes a value from the range (0 . . . 55) or the value 255. Values in the range (56 . . . 254) are currently reserved for future use. Each integer value points to a row in the table, where each row indicates the classification for all 14 OFDM symbols in a slot.

3GPP TS 38.213 Table 11.1.1-1: Slot formats for normal cyclic prefix

| Format | \multicolumn{14}{c}{Symbol number in a slot} | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | U | D | D | D | F | F | U | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} | | | | | | | | | | | | | |
| 255 | \multicolumn{14}{l}{UE determines the slot format for the slot based on TDD-UL-DL-ConfigurationCommon, or TDD-UL-DL-ConfigDedicated and, if any, on detected DCI formats} | | | | | | | | | | | | | |

According to the specification as described above, DCI Format 2_0 carries slot format indicators (SFIs) to a group of UEs for the current slot and possibly a number of future slots. To limit the DCI overhead, a table of slot format combinations is pre-configured semi-statically by RRC signaling. A particular row in the table contains SFIs for up to a maximum of 256 slots. The number of slot-format combinations in the table (rows) is up to a maximum of 512. The maximal configuration for the table is illustrated in Table 1 where $SFI_{m,n}$ is the SFI for the $n^{th}$ slot ($n^{th}$ column) of the $m^{th}$ slot format combination ($m^{th}$ row).

Table 1 illustrates an example RRC configuration of slot format combination table (maximal configuration). Each entry in the table is an SFI pointing to a row in 3GPP TS 38.213 Table 11.1.1-1. The maximum number of combinations is 512, and the maximum number of slots for a given combination is 256.

TABLE 1

| Slot Format Combinations ID | Slot-0 | Slot-1 | ... | Slot0255 |
|---|---|---|---|---|
| 0 | $SFI_{0,0}$ | $SFI_{0,1}$ | ... | $SFI_{0,255}$ |
| 1 | $SFI_{1,0}$ | $SFI_{1,1}$ | ... | |
| . | . | . | . | . |
| . | . | . | . | . |
| . | . | . | . | . |
| 511 | $SFI_{511,0}$ | $SFI_{511,1}$ | ... | $SFI_{511,255}$ |

As explained, the DCI Format 2_0 message indicates (e.g. points to) a slotFormatCombinationID (the row number in the table) for a specific serving cell in corresponding SFI-Index field. The position of the SFI-Index field for the corresponding serving cell starts from the "positionInDCI" bit in the DCI configured in SlotFormatCombinationsPerCell and ends at the beginning of the position of the next SFI-index in DCI.

Note that this table shows the maximal configuration. A typical configuration may include many fewer rows and columns.

FIG. 3 illustrates an example of configuration for a serving cell with ServingCellID=3 where the positionInDCI value for this serving cell equals 8 which means that the SFI-index for the serving cell starts at bit 8 (counting from 0). It is noted that 4 slot format combinations are configured for this cell each with a slotformats indicating 6 consecutive slot patterns. This means the UE should assume a format will be indicated in the DCI by SFI-index for the next 6 slots from the point of detecting the GC-PDDCH carrying the DCI. For this example, the DCI is indicating the last slotFormatCombination in the SlotFormatCombinations which is indicated by slotFormatCombinationID=3, therefore the SFI index corresponds to bit values "11". And the DCI becomes xxxxxxxx11xx . . . (the x's are SFI-indices set for other serving cells).

NR in Unlicensed Spectrum (NR-U)

For a node (e.g., NR-U gNB/UE, LTE-LAA eNB/UE, or WiFi AP/STA)) to be allowed to transmit in unlicensed spectrum (e.g., 5 GHz band), it typically needs to perform a clear channel assessment (CCA). This procedure typically includes sensing the medium to be idle for a number of time intervals. Sensing the medium to be idle can be done in different ways, e.g. by using energy detection, preamble detection and/or using virtual carrier sensing. The latter implies that the node reads control information from other transmitting nodes informing when a transmission end. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time), as shown in 3GPP TS 37.213 "Physical layer procedures for shared spectrum channel access" Tables 4.1.1-1 and 4.2.1-1.

In Wi-Fi, feedback of data reception acknowledgements (ACKs) is transmitted without performing clear channel assessment. Preceding feedback transmission, a small duration (called SIFS) is introduced between the data transmission and the corresponding feedback which does not include actual sensing of the channel. In 802.11, the SIFS period (16 µs for 5 GHz OFDM PHYs) is defined as:

$$aSIFSTime = aRxPHYDelay + aMACProcessingDelay + aRxTxTurnaroundTime$$

aRxPHYDelay defines the duration needed by the PHY layer to deliver a packet to the MAC layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch the direction from reception to transmission.

In NR-U bands, a similar gap to accommodate for the radio turnaround time can be allowed, as per 3GPP TR 38.899 "Study on NR-based access to unlicensed spectrum". This can enable the transmission of PUCCH carrying UCI feedback as well as PUSCH carrying data and possible UCI within the same transmit opportunity (TXOP) acquired by the initiating gNB. For example, the UE can transmit feedback without performing clear channel assessment before PUSCH/PUCCH transmission as long as the gap between DL and UL transmission is less than or equal to 16 us. When the gap between DL and UL is larger than 25 us, the UE can transmit feedback after 25 us CCA is successful. Operation in this manner is referred to as "COT sharing."

FIG. 4 illustrates example TXOPs both with and without COT sharing after CCA is successful at the gNB.

SUMMARY

It is an object of the present disclosure to obviate or mitigate at least one disadvantage of the prior art.

There are provided systems and methods for indicating availability of configured resources.

In a first aspect there is provided a method performed by a wireless device. The wireless device comprises a radio interface and processing circuitry and can be configured to configure the wireless device with a plurality of frequency resources. The wireless device receives a downlink control information (DCI) message including at least one slot format indicator (SFI) field and a frequency resource indicator field. The SFI indicates a slot format for a corresponding frequency resource. The frequency resource indicator indicates whether the corresponding frequency resource is available for operation. The wireless device determines whether the corresponding frequency resource is available for operation in accordance with the frequency resource indicator.

In some embodiments, configuring the wireless device includes receiving configuration information from a network node. The plurality of frequency resources can include one or more of: a carrier, a sub-band of a carrier, a set of resource blocks (RBs) on a carrier, a listen before talk (LBT) bandwidth, and a bandwidth part (BWP).

In some embodiments, the DCI message is a DCI format 2_0.

In some embodiments, determining whether the corresponding frequency resource is available for operation can include determining if the corresponding frequency resource is available for operation during a duration of the SFI in accordance with the frequency resource indicator.

In some embodiments, the DCI message further includes an associated channel occupancy time (COT) duration field. The wireless device can determine whether the corresponding frequency resource is available for operation during the COT duration in accordance with the frequency resource indicator.

In some embodiments, the wireless device identifies the corresponding frequency resource based at least in part on a bit position of the frequency resource indicator field in the received DCI message. In some embodiments, the frequency resource indicator comprises a plurality of bits wherein each bit corresponds to one of the plurality of frequency resources.

In some embodiments, responsive to determining that the corresponding frequency resource is available for operation, the wireless device monitors the frequency resource. The wireless device can monitor the frequency resource for a physical downlink control channel (PDCCH). In some embodiments, responsive to determining that the corresponding frequency resource is available for operation, the wireless device receives a channel-state information reference signal (CSI-RS) on the frequency resource.

In some embodiments, responsive to determining that the corresponding frequency resource is not available for transmission/reception, the wireless device does not monitor the frequency resource.

In some embodiments, the wireless device determines that the SFI field corresponds to a reserved value in a frequency resource configuration; and determines a number of slots for which the frequency resource is unavailable in accordance with the reserved value.

In another aspect there is provided a method performed by a network node. The network node comprises a radio interface and processing circuitry and can be configured to generate a downlink control information (DCI) message including at least one slot format indicator (SFI) field and a frequency resource indicator field. The SFI indicates a slot format for a corresponding frequency resource. The frequency resource indicator indicates whether the corresponding frequency resource is available for operation. The network node transmits the generated DCI message to one or more wireless devices.

In some embodiments, the network node configures one or more wireless devices with a plurality of frequency resources. Configuring the one or more wireless devices can include transmitting configuration information. In some embodiments, the plurality of frequency resources can include one or more of: a carrier, a sub-band of a carrier, a set of resource blocks (RBs) on a carrier, a listen before talk (LBT) bandwidth, and a bandwidth part (BWP).

In some embodiments, the DCI message is a DCI format 2_0.

In some embodiments, a bit position of the frequency resource indicator field in the received DCI message identifies a corresponding frequency resource.

In some embodiments, the network node transmits a channel-state information reference signal (CSI-RS) on an available frequency resource.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
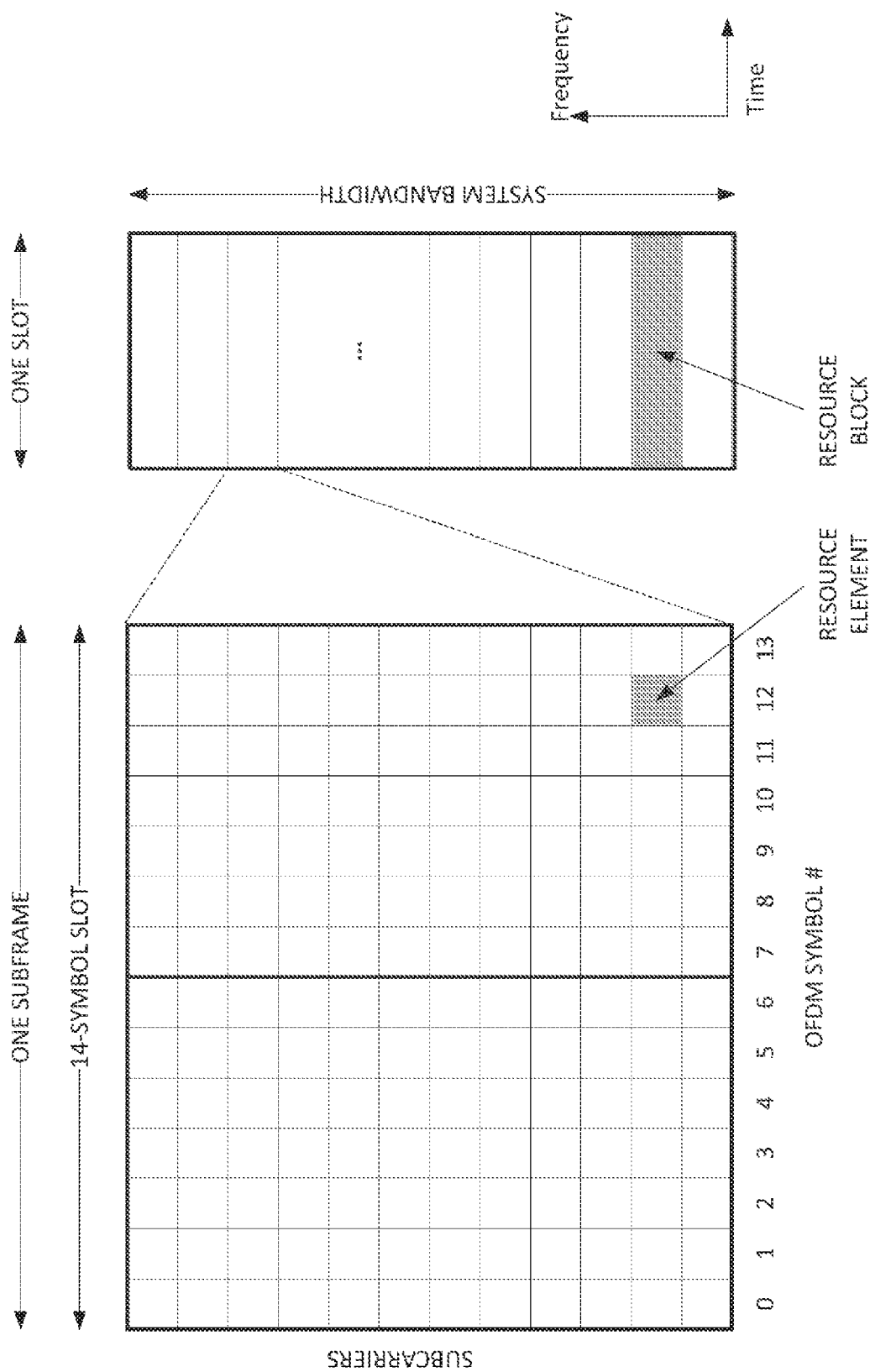
FIG. 1 illustrates an example of NR physical resources.
Figure 2:
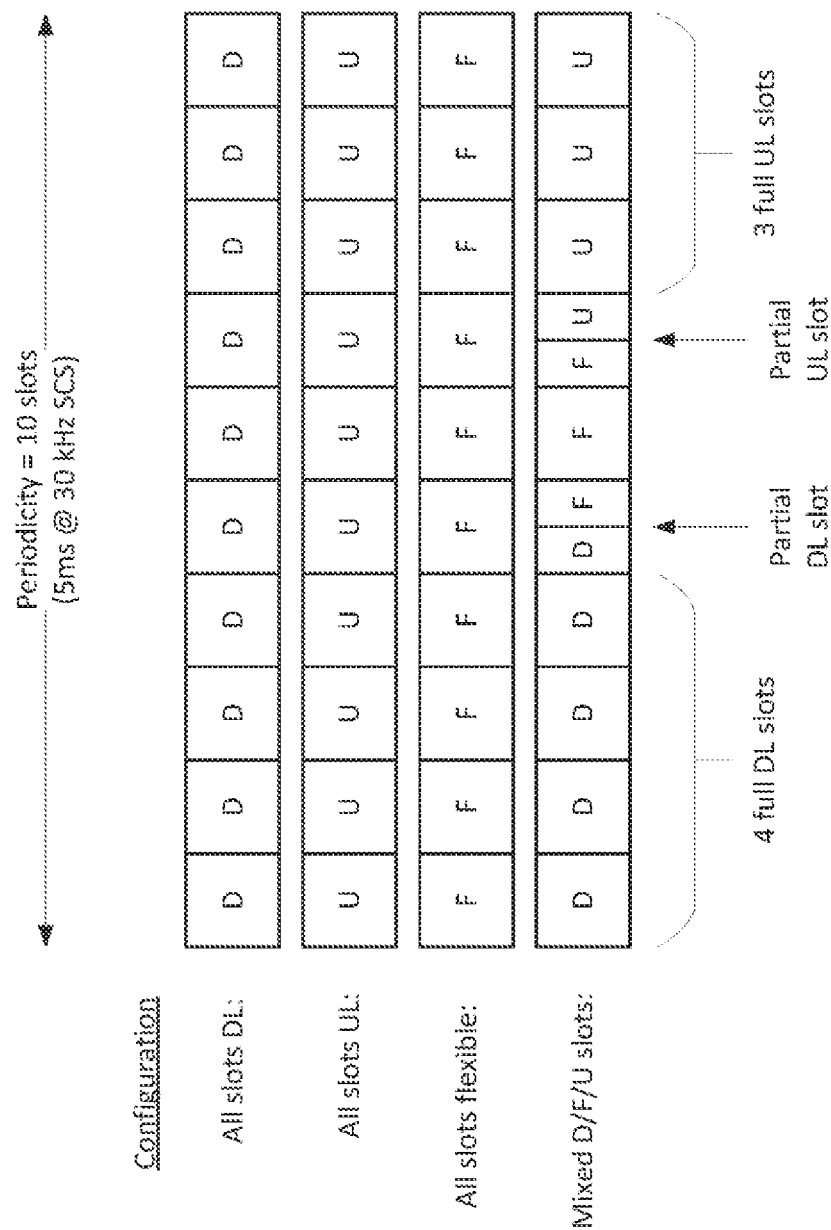
FIG. 2 illustrates example semi-statically configured cell-specific TDD patterns.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail herein with respect to FIG. 10.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 12.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G NR concepts, beams may be used instead of cells and, as such, it is important to note that the concepts described herein are equally applicable to both cells and beams.

Figure 5:
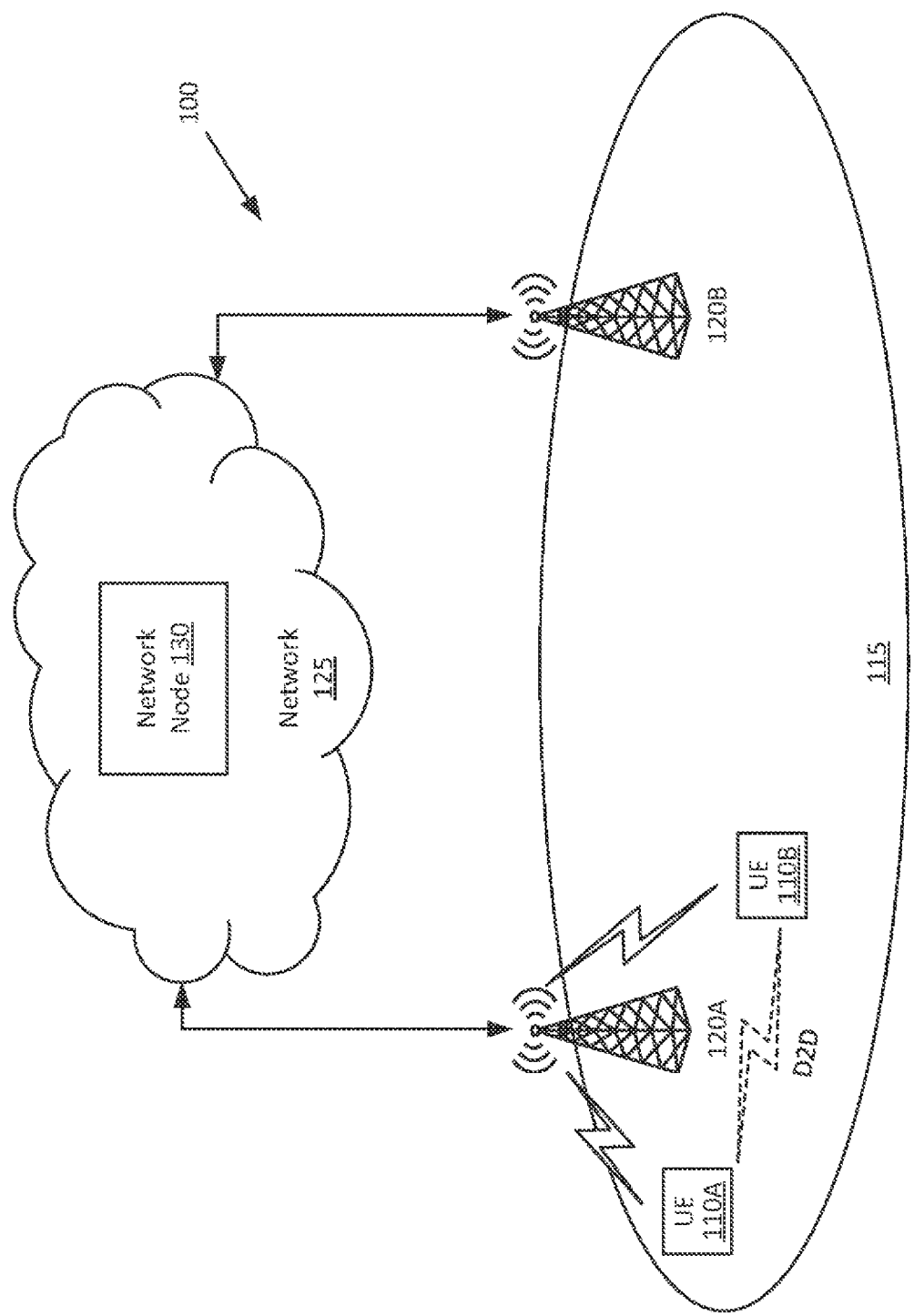
FIG. 5 illustrates an example wireless network.

FIG. 5 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 6:
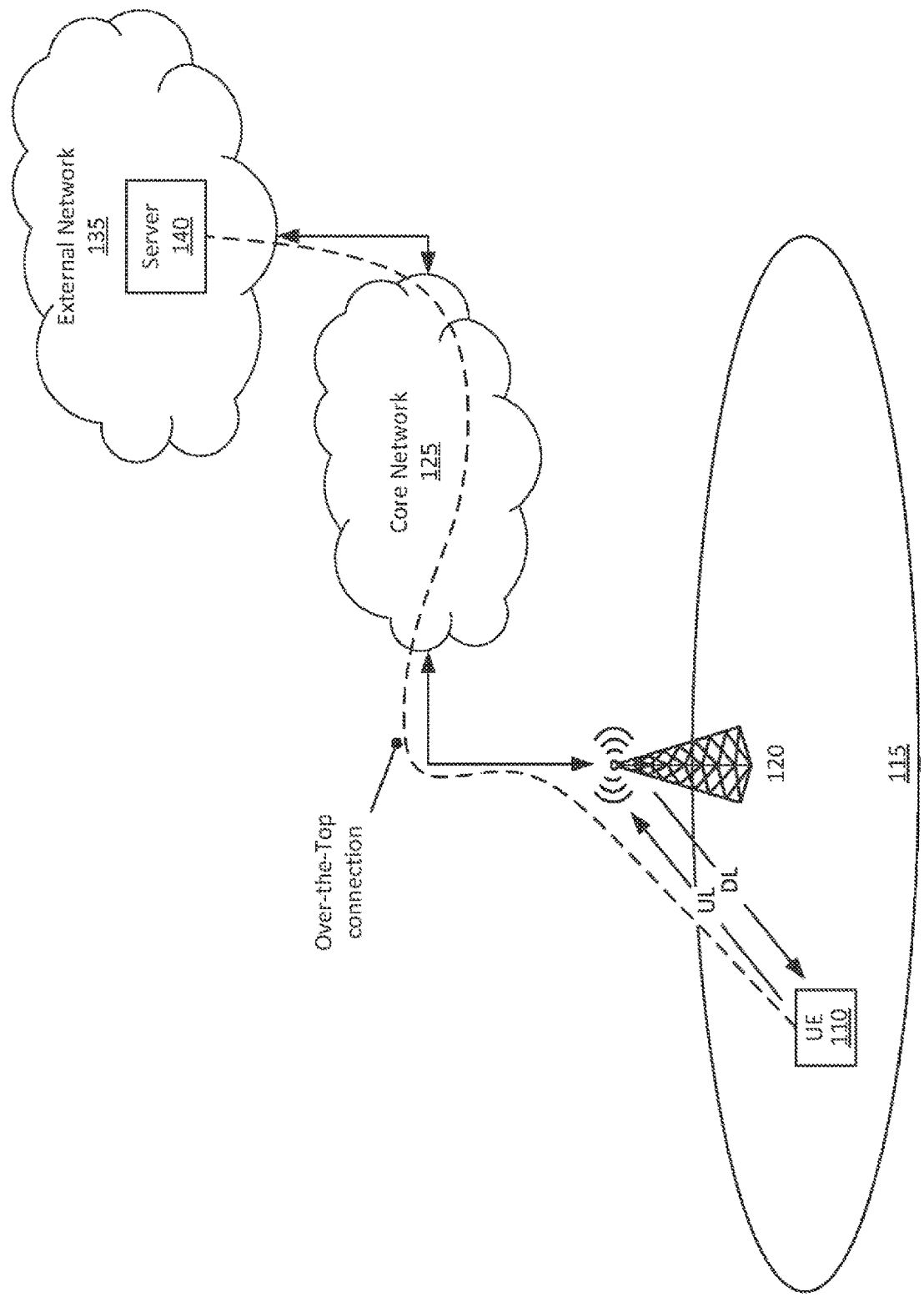
FIG. 6 illustrates an example of signaling in a wireless network.

FIG. 6 illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

In conventional networks, such as NR Release 15, DCI format 2_0 is used for indication of the transmission direction per symbol in time domain up to 256 slots periodically. As explained, the time domain slot format indication is carried in DCI format 2_0 by corresponding bit(s) for each serving cell. However, beside this indication, there is no other information being transmitted regarding structure/status of the transmission in the frequency domain.

In some cases, it may be beneficial to transmit some additional information regarding the state of the frequency domain to a group of one or more UEs. For example, it may be beneficial to indicate the availability of a carrier and/or LBT bandwidth via DCI format 2_0 carried by GC-PDCCH explicitly.

Accordingly, some embodiments described herein include mechanisms for signaling an indication of availability and/or unavailability of frequency resource (e.g. carriers and/or LBT bandwidth). The indication can be based on one or more of following: defining a marker signaled using SFI index in DCI format 2_0, reinterpreting or adding new slot format combination, and/or defining a new field in DCI format 2_0.

Some embodiments will be described based on the existing GC-PDCCH signaling structure carrying DCI Format 2_0 and in some examples can make use of the reserved values in Table 11.1.1-1 in 3GPP TS 38.213 to provide additional information.

In one embodiment, a marker signaled using SFI index in DCI format 2_0 can indicate that the corresponding frequency resources are not available for any DL and/or UL operation in a specific cell or group of cells.

The marker can be indicated using one of remaining reserved values [56 . . . 254] in the SFI formats table 11.1.1-1. The marker is configured and assigned to one or some of the slots in a "slot Format Combination" and indicates that the corresponding slots are not available for transmission for corresponding serving cell.

An example of configuring a marker is illustrated in Table 2, where the marker is indicated by "Reserved value R" and is assigned to one or more slots as a "Slot Format Combination" which is mapped to a "slot Format Combination ID" labeled as "x" in the table. For example, in Table 2 "reserved value R" is assigned to slot-0, slot-1, and slot-2 which means that the frequency resources are not available for transmission corresponding serving cell for the period indicated by these 3 slots.

TABLE 2

Example marker for configuration of availability of carrier/LBT bandwidth or BWP

| Slot Format Combinations ID | Slot-0 (Current Slot) | Slot-1 | Slot-2 | Slot-3 |
|---|---|---|---|---|
| 0 | $SFI_{0,0}$ | $SFI_{0,1}$ | $SFI_{0,2}$ | $SFI_{0,3}$ |
| 1 | $SFI_{1,1}$ | $SFI_{1,1}$ | $SFI_{1,2}$ | |
| . | . | . | . | . |
| . | . | . | . | . |
| . | . | . | . | . |
| x | Reserved value R | Reserved value R | Reserved value R | |
| y | Reseved value R2 | | | |
| . | . | . | . | . |
| . | . | . | . | . |

In this embodiment, examples of "frequency resources" among others are carrier(s)/LBT bandwidth(s)/subband(s)/BWP(s). Furthermore, one or some of the frequency resources may be within a BWP and may be associated with one or more of: a bandwidth and carrier or relative frequency shift with respect to a pre-defined reference such as a carrier or a BWP.

In this embodiment, example of the "cell" or "group of cells", are the cell(s) that transmit the corresponding DCI format 2_0 or another serving cell for UE in carrier aggregated (CA) or dual connected (DC) modes other than the cell on which the indication is carried.

In a variation of this embodiment, a different reserved value can be used to indicate that frequency resources are unavailable for the duration in terms of number of slots equal to the maximum duration for which slot information is provided in the current GC-PDCCH message for any of the frequency resources. As an example, in Table 2, Reserved value R2 can indicate that the frequency resources are not available for the maximum number of slots for which slot information is provided across all the frequency resources.

In another embodiment, similar to as describe above, the different reserved values can indicate different numbers of slots for which the frequency resources are unavailable for DL or UL transmission. For example, in Table 3, reserved value R1 indicates 1 slot, reserved value R2 indicates 2 slots, and reserved value R3 indicates 3 slots, and so on.

TABLE 3

Example marker for configuration of availability of carrier/LBT bandwidth or BWP

| Slot Format Combinations ID | Slot-0 (Current Slot) | Slot-1 | Slot-2 | Slot-3 |
|---|---|---|---|---|
| 0 | $SFI_{0,0}$ | $SFI_{0,1}$ | $SFI_{0,2}$ | $SFI_{0,3}$ |
| . | . | . | . | . |
| . | . | . | . | . |
| . | . | . | . | . |
| x | Reserved value R1 | | | |
| x + 1 | Reserved value R2 | | | |
| x + 2 | Reserved value R3 | | | |

TABLE 3-continued

Example marker for configuration of availability of carrier/LBT bandwidth or BWP

| Slot Format Combinations ID | Slot-0 (Current Slot) | Slot-1 | Slot-2 | Slot-3 |
|---|---|---|---|---|
| . | . | . | . | . |
| . | . | . | . | . |
| . | . | . | . | . |

In one variation, a set of SFI index bits in the DCI format 2_0 can be interpreted as the indicator for LBT bandwidth(s)/LBT subband(s)/subband(s)/channel(s).

Figure 3:
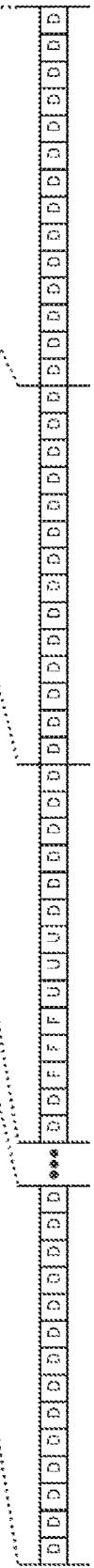
FIG. 3 illustrates an example slot format combination.
Figure 4:
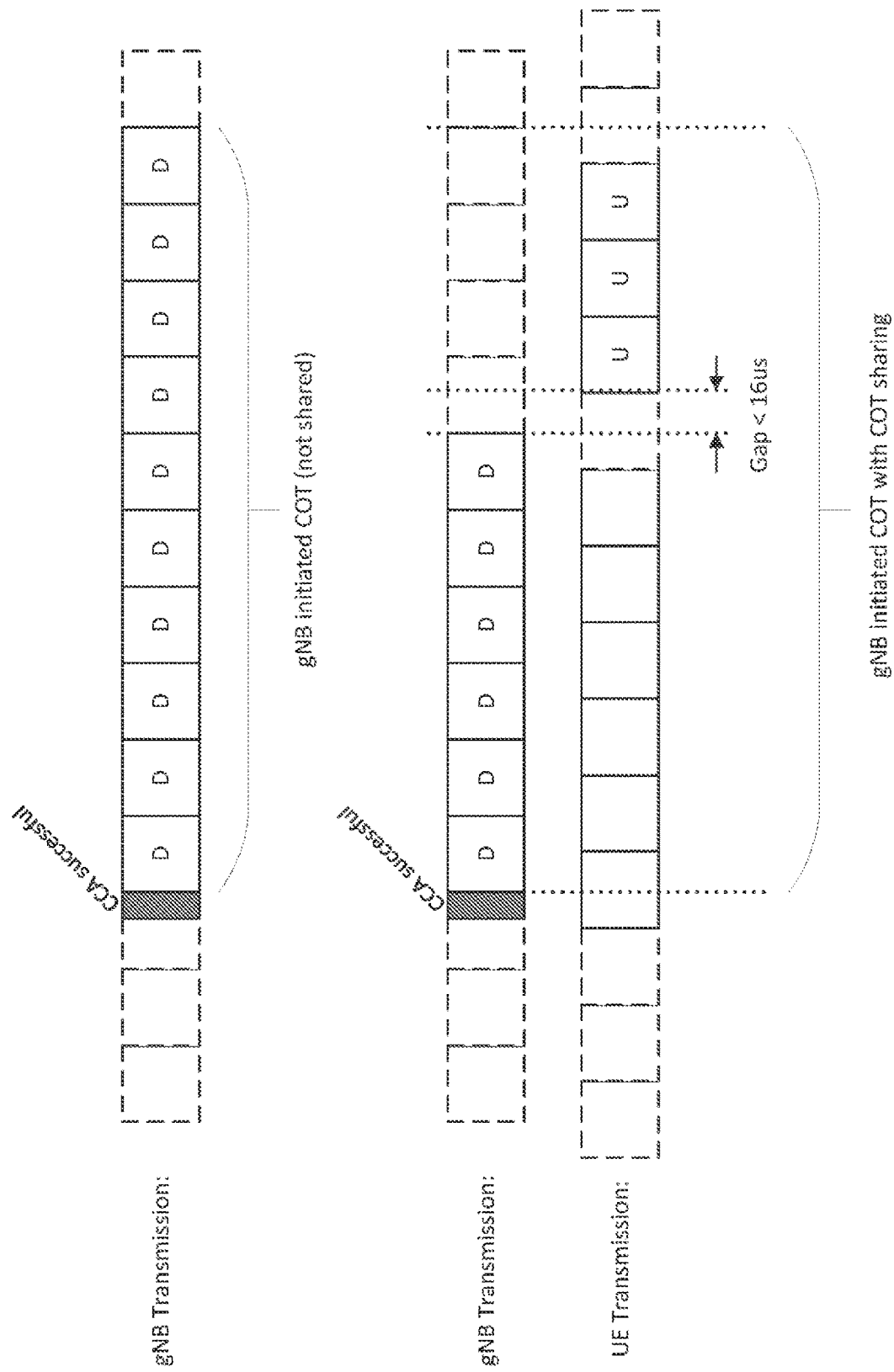
FIG. 4 illustrates example transmit opportunities.

In another variation, a set of SFI-index bits in the DCI format 2_0 can correspond to a specified PRB range of a carrier. Using the same example from FIG. 3, the DCI can indicate the last slotFormatCombination in the SlotFormatCombinations which is indicated by slotFormatCombinationID=3, therefore the SFI index corresponds to bit values "11". The DCI becomes xxxxxxxx11xx. In this example, the bits '11' correspond to PRB range N1:N2 of the serving cell with ServingCellID=3. The PRB index N1 is greater than or equal to 0 and the PRB index N2 is less than the number of PRBs of a BWP of the serving cell. Here the x's correspond to other PRB ranges of the same or other serving cells. The PRB range N1:N2 is indicated to the UE by radio resource control (RRC) signaling. In one non-limiting embodiment, the PRB range is indicated as a new field within the information element SlotFormatCombinationsPerCell.

In another variation, a set of SFI index bits in the DCI format 2_0 can be interpreted as the indicator for a BWP.

In another embodiment, the indication of whether frequency resources are not available can be signaled using SFI-index in DCI format 2_0 for any DL and/or UL operation in a specific cell or group of cells by reinterpreting one or some values of "Slot Format Indicator" and/or, "slot Format Combination" and/or "Slot Format Combination ID".

In this embodiment, example of "frequency resources" among others are carrier(s)/LBT bandwidth(s)/subband(s)/BWP(s). Furthermore, one or some of the frequency resources may be within a BWP and may be associated with one or more of: a bandwidth and carrier or relative frequency shift with respect to a pre-defined reference such as a carrier or a BWP.

In this embodiment, example of the "cell" or "group of cells", are the cell(s) that transmit the corresponding DCI format 2_0 or another serving cell for UE in carrier aggregated (CA) or dual connected (DC) modes or than the cell on which the indication is carried.

In one example of this embodiment, setting all the slots which are not available for specific duration in a "Slot Format Combination" to UL, would be an indication that the frequency resources are not available DL or UL transmission for this duration. This is shown in Table 4a where slot-0, slot-1 and slot-2 are not available for any DL or UL transmission. Note that value 2 is SFI for slot with all UL symbols.

TABLE 4a

Indication that frequency resources are unavailable
if all slot formats are set to uplink

| Slot Format Combinations ID | Slot-0 (Current Slot) | Slot-1 | Slot-2 | Slot-3 |
|---|---|---|---|---|
| 0 | $SFI_{0,0}$ | $SFI_{0,1}$ | $SFI_{0,2}$ | $SFI_{0,3}$ |
| . | . | . | . | . |
| . | . | . | . | . |
| . | . | . | . | . |
| x | 2 | 2 | 2 | |
| . | . | . | . | . |
| . | . | . | . | . |
| . | . | . | . | . |

In another example, one or more of the Slot Format Combinations IDs can be predefined to indicate that the frequency resources are not available for any transmission. In this example, there may be several options to indicate for how long period the frequency resources are not available, some options are listed in the following.

One option is that the different "Slot Format Combination ID"s indicate different number of slots for which the frequency resources are unavailable for DL or UL transmission. For example, in Table 4b, "Slot Format Combination ID"="n" is predefined to indicate that the frequency resource are unavailable for slot 0, "Slot Format Combination ID"="n+1" is predefined to indicate that the frequency resource are unavailable for slots 0, and 1, "Slot Format Combination ID"="n+2" is predefined to indicate that the frequency resource are unavailable for slots 0, 1 and 2, and so on. This can be considered different from the previously described embodiment where the reserved value in SFI table is assigned to "Slot Format Combination ID" of choice.

In another option, an empty slot format combination can be configured to indicate that the UE is not expected to be scheduled on the corresponding frequency resources (e.g. carriers/BWP/subband/LBT bandwidth) for a duration equivalent to the longest indicated slot format combination ID for the other frequency resources (e.g. carriers/BWP/LBT bandwidth).

Example RRC configuration:
Slotformatcombination(7)={slotFormatCombinationID=7
slotformats={ }
}

In another option, the period during which the frequency resources are not available is equal to the number of slots that other "slot format combination" is applicable to (for example, assuming all format combinations associated with a cell/carrier/BWP/LBT subband/channel comprise the same number of slotFormats).

TABLE 4b

Indication that carrier is unavailable by predefinition
of one or more of the slotFormatCombinationIDs

| Slot Format Combinations ID | Slot-0 (Current Slot) | Slot-1 | Slot-2 | Slot-3 |
|---|---|---|---|---|
| 1 | $SFI_{1,0}$ | $SFI_{1,1}$ | $SFI_{1,2}$ | $SFI_{1,3}$ |
| . | . | . | . | . |
| . | . | . | . | . |
| . | . | . | . | . |
| n | unavailable | | | |
| n + 1 | unavailable | unavailable | | |

TABLE 4b-continued

Indication that carrier is unavailable by predefinition
of one or more of the slotFormatCombinationIDs

| Slot Format Combinations ID | Slot-0 (Current Slot) | Slot-1 | Slot-2 | Slot-3 |
|---|---|---|---|---|
| n + 2 | unavailable | unavailable | unavailable | |
| . | . | . | . | . |
| . | . | . | . | . |
| . | . | . | . | . |

In one variation, a set of SFI index bits in the DCI format 2_0 can be interpreted as the indicator for LBT bandwidth(s)/LBT subband(s)/subband(s)/channel(s).

In another variation, a set of SFI-index bits in the DCI format 2_0 can correspond to a specified PRB range of a carrier.

In another variation, the corresponding SFI index field in the DCI format 2_0 can be interpreted as the indicator for a BWP.

In some embodiments, as a signaling option, in the RRC IE SlotFormatCombinationsPerCell, the slot format combinations can be sorted following an increasing order of the LBT bandwidth/LBT subband/channel index. In an example, there are N slot format combinations in the set, and the cell/BWP is divided into M LBT bandwidths/LBT subbands/channels. In this case, each LBT bandwidth/LBT subband/channel would then include N/M slot format combination elements. In this way, the gNB uses the slot format combination ID range to explicitly indicate LBT bandwidth/LBT subband/channel.

In other embodiments, a field in a DCI format 2_0 message can be defined or added to indicate whether frequency resources are available, or not available, for any DL and/or UL operation in a specific cell or group of cells.

In this embodiment, example of "frequency resources" among others are carrier(s)/LBT bandwidth(s)/subband(s)/BWP(s). Furthermore, one or some of the frequency resources may be within a BWP and may be associated with one or more of: a bandwidth and carrier or relative frequency shift with respect to a pre-defined reference such as a carrier or a BWP.

In this embodiment, example of the "cell" or "group of cells", are the cell(s) that transmit the corresponding DCI format 2_0 or another serving cell for UE in carrier aggregated (CA) or dual connected (DC) modes or than the cell on which the indication is carried.

In an example embodiment, a field "frequency resource indicator" of one or more extra bit(s) can be defined for each SFI-index to indicate whether the corresponding frequency resources are available or not. Example of a modified DCI format 2_0:

Slot format indicator 1+frequency resource indicator 1, Slot format indicator 2+frequency resource indicator 2, . . . , Slot format indicator N+frequency resource indicator N In the above example, if it is indicated that the frequency resources of corresponding cell are not available by the "frequency resource indicator" the duration for which the cell is not available can be indicated by the corresponding SFI.

In a variation of this example, an extra field can be defined and added to the DCI format 2_0 where each bit in the field indicates availability of all frequency resources. Example of a modified DCI format 2_0:

Frequency resource indicator, Slot format indicator 1, Slot format indicator 2, . . . , Slot format indicator N In another example, a carrier can contain 2 LBT-bandwidths and 4 such carriers overall. In this case, for indication of availability/unavailability of each LBT bandwidth of each carrier a field with length of 2 bits is defined for each carrier after the corresponding SFI field, for example in the following:

Slot format indicator 1+01, Slot format indicator 2+01, Slot format indicator 3+10, Slot format indicator 4+11

For the first carrier and second carriers, the second LBT bandwidths (01) are available, for the third carrier the first LBT bandwidth (10) is available, and both LBT bandwidths (11) are available for fourth carrier.

The following example is for the case where each slot format indicator is used for an LBT bandwidth:

Slot format indicator 1+1, Slot format indicator 2+1, Slot format indicator 3+0, Slot format indicator 4+0, Slot format indicator 5+0, Slot format indicator 6+1

In the above example the first, second and last (e.g. 6th) LBT bandwidths are available.

The following example is for the case where all carriers are addressed using one field in DCI and indicate the same pattern as the previous example, i.e. the first, second and last (6th) LBT bandwidths are available:

110001+Slot format indicator 1, Slot format indicator 2, Slot format indicator 3, Slot format indicator 4, Slot format indicator 5, Slot format indicator 6

In one variation, all frequency resources (e.g. all carriers/BWPs/LBT BWPs) can have the same COT structure. Then the gNB can signal to the UE the same SFI indicator for all carriers/BWPs/LBT BWPs that are available at the time. The required modifications would include: i) the servingcellID in RRC will include the list of all candidate cells, ii) DCI carries available carriers/BWPs/LBT BWPs indicators.

In an exemplary embodiment, the gNB can skip the SFI bits in DCI format 2_0 for the carrier/LBT bandwidth/subband/group of PRBs on which the DCI is transmitted, since that carrier/LBT bandwidth/subband/group of PRBs must be available for the duration indicated by the SFI.

In some embodiments, the gNB and UE(s) behaviors can be configured accordingly.

In some embodiments, in the first slot(s) of the COT, when the gNB does not have enough time to prepare the COT structure indicators after LBT, UEs can monitor the DL burst by monitoring (GC-)PDCCH over all carriers/BWPs/LBT BWPs as in NR Rel-15.

Some embodiments include self-contained carrier indicators. The gNB can prepare and send COT structure indicators per carrier/BWP/LBT BWP (send COT structure indicators using different DCIs over different carriers). The UE(s) can monitor all carriers/BWP/LBT BWP at least until receiving correctly the COT structure indicators from gNB. Optionally, a UE can stop monitoring on unavailable carriers for power saving if it is configured as such.

Some embodiments include cross-carrier indicators over single carrier. The gNB can prepare and send a single/joint COT structure indicator for all carriers/BWPs/LBT BWPs in a single DCI over a single carrier, e.g., DL carrier with smallest index. The UE(s) can monitor all carriers/BWP/LBT BWP at least until receiving correctly the COT structure indicators from gNB.

Some embodiments include cross-carrier indicators, repetition over all available carriers. The gNB can prepare a single/joint COT structure indicator for all carrier/BWP/LBT BWP and send the same copy of the COT structure indicators over all available (or a subset of) DL carriers. The UE(s) can monitor all carriers/BWP/LBT BWP at least until receiving correctly at least one COT structure indicators from gNB.

Some embodiments include cross-carrier indicators, over primary carrier. The gNB can prepare a single/joint COT structure indicator for all carriers/BWPs/LBT BWPs and send the joint COT structure indicator over primary DL carrier. The UE(s) can monitor only the primary DL carrier at least until receiving correctly COT structure indicator from a gNB. Then, the UE can monitor all available carriers based on COT structure indicator.

Some embodiments include retrying LBT (on not free carriers) in middle of the COT. In this embodiment, the gNB can overwrite the COT structure of an ongoing COT if gNB re-tries LBT on unavailable carrier(s) and determine if it is available. Then, a gNB may schedule UEs (that are active or not sleeping) on those carrier(s) in the remaining of the COT.

Some embodiments described herein include configuration of frequency resources.

Some embodiments described herein have suggested a variety of methods for indicating availability/unavailability of frequency resources (cell, carrier, LBT bandwidth/subband, BWP, etc.) in DCI Format 2_0. A frequency resource can be a cell, carrier, LBT bandwidth/subband or BWP. The configuration of the frequency resources, such as PRB range and any other information, can be specified in the specification, or communicated to UEs by system broadcasting, or by dedicated RRC signaling.

In an exemplary implementation, a UE can be configured with multiple serving cells/carriers. For each configured serving cell, the UE is provided with the number of LBT bandwidth/subband and the corresponding PRB allocation. A bit in frequency resource indication in DCI Format 2_0 can indicate whether the associated PRBs for the corresponding LBT bandwidth/subband are available for transmission and reception during the duration indicated by the SFI.

In another exemplary implementation, the LBT bandwidth/subband to PRB mapping can be predefined in the specification. A bit in the frequency resource indication in DCI Format 2_0 can indicate whether the corresponding LBT, LBT bandwidth/subband is available for transmission and reception during the duration indicated by the SFI, while the exact PRBs in question can be derived from the specification.

Some embodiments include a slot format combination table that incorporates inputs from multiple tables in each entry of each row.

In this embodiment, a set of properties, or values or parameters that are defined separate from the slot format table (e.g. Table 11.1.1-1 in TS 38.213) can be encoded together with the SFI information from Table 11.1.1-1 in the slot format combination table. In a first table, a set of properties, values or parameters are indexed. The slot format combination table is then modified so that each entry of the table can indicate an SFI value and an index from the first table in which properties, values or parameters are indexed. This index can then indicate information in addition to the SFI information in Table 11.1.1-1 in TS 38.213. This structure provides a very general framework by which the DCI signaling currently defined for DCI format 2_0 can be used unchanged to communicate information in addition to the SFI information defined in Rel-15 NR. An example of this embodiment is shown in Tables 5 and 6 below.

TABLE 5

General properties, values of parameters of
various types that are assigned an index

| Index | Property |
|---|---|
| 0 | Frequency resources corresponding to this slot format combination table are unavailable in this slot |
| 1 | Frequency resources corresponding to this slot format combination table are unavailable for the maximum number of slots for which SFI information has been provided on any frequency resources in this DCI message |
| 2 | All DL to UL switches in this slot requires no LBT for the UL transmission |
| 3 | All DL to UL switch occurs in this slot require a 25 microsecond LBT for the UL transmission |
| 4 | The channel occupancy initiated by the gNB ends at the end of this slot |
| ... | ... |

TABLE 6

Slot format combination table that includes SFI information
with an index from the table above to indicate a property,
value or parameter associated with the slot.

| Slot Format Combination | Slot-0 | Slot-1 | Slot-2 | Slot-3 |
|---|---|---|---|---|
| 0 | $SFI_{0,0} + 1$ | $SFI_{0,1}$ | $SFI_{0,2}$ | $SFI_{0,3}$ |
| 1 | $SFI_{1,0} + 2$ | $SFI_{1,1} + 3$ | $SFI_{1,2} + 4$ | $SFI_{1,3}$ |
| 2 | $SFI_{2,0}$ | $SFI_{2,1}$ | $SFI_{2,2} + 0$ | $SFI_{2,3} + 4$ |
| ... | ... | ... | ... | ... |

According to some of the embodiments described herein, it is possible to inform a device about the availability of part of a frequency domain resource (e.g. other carriers or LBT bandwidths or a PRB range) by detecting the control information on other parts of frequency resources (e.g. one of the carriers or LBT bandwidths or a PRB range). This can be beneficial for a UE to defer PDCCH monitoring and/or defer sensing of the medium on other carriers or LBT bandwidth which can result in power saving. Some of these embodiments can provide a low-overhead approach to signaling availability of carrier and or LBT bandwidth by using the existing fields in DCI format 2_0 carried by GC-PDCCH, thus causing minimal impact on the specification(s).

Figure 7:
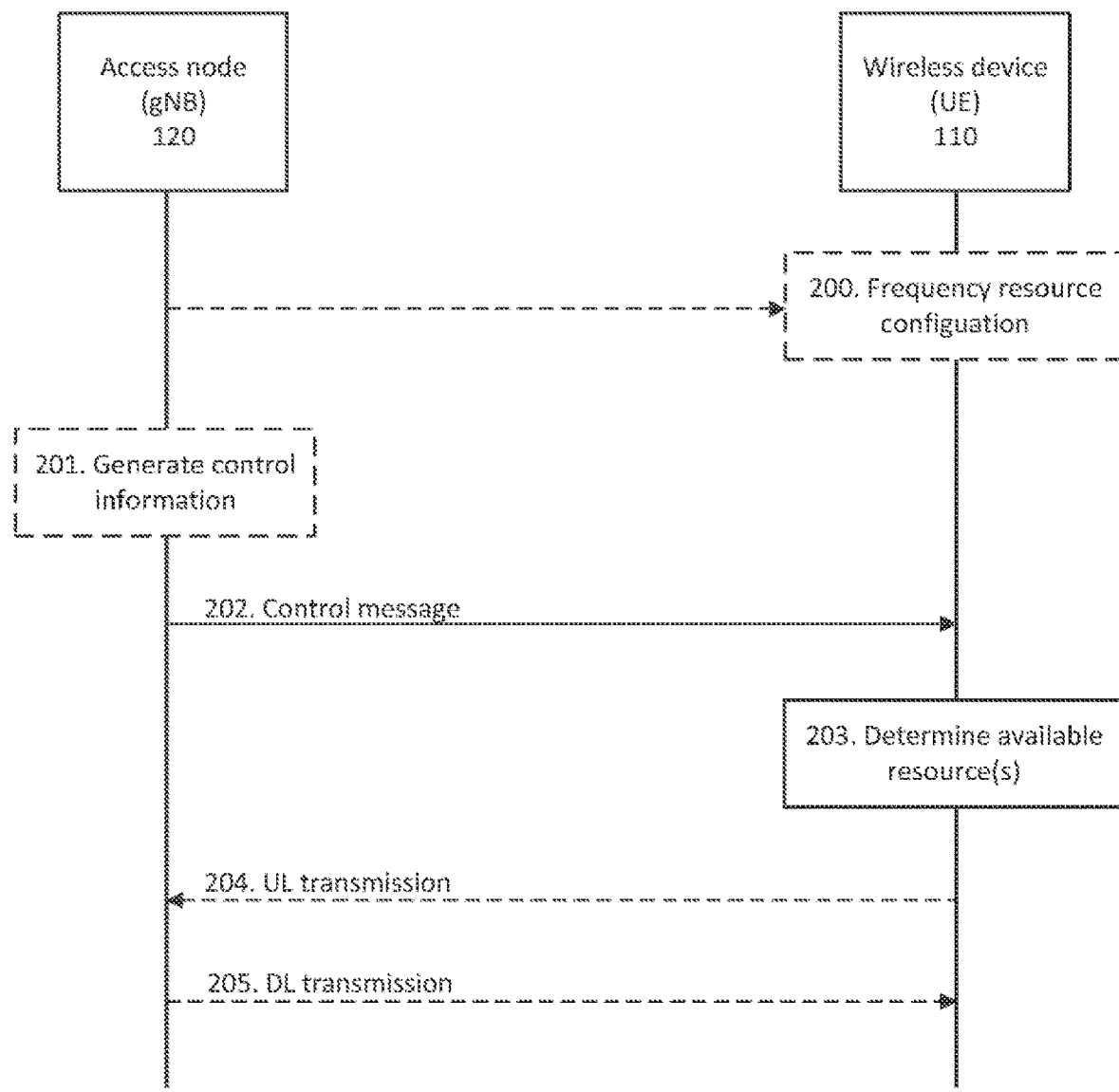
FIG. 7 is an example signaling diagram.

FIG. 7 is an example signaling diagram. Wireless device 110 is configured with a plurality of frequency resources (step 200). In some embodiments, the frequency resource configuration can be obtained from an access node, such as gNB 120. In some embodiments, wireless device 110 can be pre-configured with the frequency resource configuration information.

Access node 120 can generate parameters for a control message, such as a DCI message (step 201). In some embodiments, the control message can be a DCI format 2_0 message as described herein. The control message can include slot format information and/or frequency domain information, such as an indication of availability of frequency resource(s). The message can indicate if one or more frequency resources are available/unavailable for DL or UL transmission. For example, the control message can indicate a number of slots and/or duration for which resources are not available. The resources can correspond to resources blocks (e.g. PRBs) and/or a resource block range.

Access node 120 transmits the configured control message to the wireless device 110 (step 202). Wireless device 110 can determine available resources in accordance with the received control message (step 203). In some embodiments, this can include determining frequency resources that are available/unavailable for DL or UL transmission. Wireless device 110 can then optionally transmit data to (step 204) and/or receive data from (step 205) access node 120, in accordance with the determined resource(s).

Figure 8:
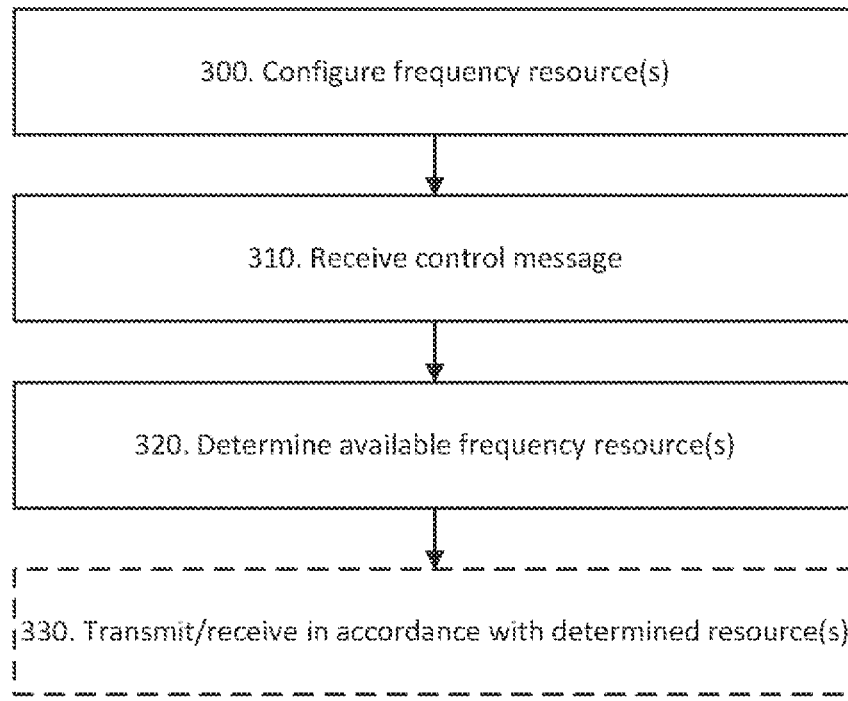
FIG. 8 is a flow chart illustrating a method which can be performed in a wireless device.

FIG. 8 is a flow chart illustrating a method which can be performed in a wireless device, such as UE 110 as described herein. The method can include:

Step 300: Configuring the wireless device with a plurality of frequency resources. In some embodiments, frequency resource configuration can be obtained from a network node, such as gNB 120. This can include receiving configuration information via system broadcast, via RRC signaling, etc. In some embodiments, the wireless device can be pre-configured with the frequency resource configuration information. The frequency resources can include one or more of: a carrier, a sub-band of a carrier, a set of resource blocks (RBs) on a carrier, a listen before talk (LBT) bandwidth, and a bandwidth part (BWP).

Step 310: Receiving a control message. The control message can be received from a network node, such as gNB 120. The control message can include an indication of availability and/or unavailable frequency resource(s) for UL and/or DL transmission. In some embodiments, the control message can be a DCI message, such as a DCI format 2_0.

The control message can include at least one slot format indicator (SFI) field indicating a slot format for a corresponding frequency resource. The control message can include at least one frequency resource indicator indicating whether a corresponding frequency resource is available for operation (e.g. transmission/reception). In some embodiments, a frequency resource indicator can be associated with one or more SFIs. In some embodiments, the control message can further include at least one associated channel occupancy time (COT) duration field.

Step 320: Determining available/unavailable frequency resource(s) in accordance with the received control message. In some embodiments, the availability of operation of a frequency resource can be determined in accordance with the frequency resource indicator.

In some embodiments, the wireless device identifies the corresponding frequency resource (e.g. from the plurality of configured frequency resources) based at least in part on a bit position of the frequency resource indicator field in the received DCI message. Similarly, in some embodiments, the wireless device can identify the corresponding frequency resource based at least in part on a bit position of the SFI field in the received DCI message.

In some embodiments, the frequency resource indicator can comprise a plurality of bits (e.g. bit field or bit map) wherein each bit (or set of bits) corresponds to one of the plurality of configured frequency resources. In some embodiments, each SFI field in the DCI can have an associated frequency resource indicator field. In other embodiments, the DCI can include a single frequency resource indicator field that is associated with a plurality of SFI fields.

In some embodiments, a specific value carried in a frequency resource indicator field in the control message can indicate an available bandwidth (e.g. a specific LBT bandwidth or BWP, etc.) for the corresponding frequency resource.

In some embodiments, a specific value (e.g. a reserved value) carried in an SFI field in the control message can indicate a number of slots for which a frequency resource is unavailable.

In alternative embodiments, the wireless device can receive a control message (e.g. DCI) that includes at least one of an SFI field and/or an available resource indicator field. The wireless device can determine available/unavailable frequency resource(s) in accordance with the received control message, based on the SFI and/or the available resource indicator and/or a combination of both fields and/or other parameters as have been described in the various embodiments herein.

Step 330: The wireless device can optionally transmit and/or receive data in accordance with the determined available frequency resource(s). For example, responsive to determining that a frequency resource is available for operation, the wireless device monitors the available frequency resource. The wireless device can monitor the frequency resource for a PDCCH. The wireless device can receive a transmission such as a CSI-RS on the frequency resource.

Responsive to determining that a frequency resource is unavailable for operation, the wireless device does not monitor the frequency resource. Accordingly, the wireless device would not transmit or receive on the unavailable frequency resource. For example, the wireless device does not receive a CSI-RS on the unavailable frequency resource.

It will be appreciated that one or more of the above steps can be performed simultaneously and/or in a different order. Also, steps illustrated in dashed lines are optional and can be omitted in some embodiments.

Figure 9:
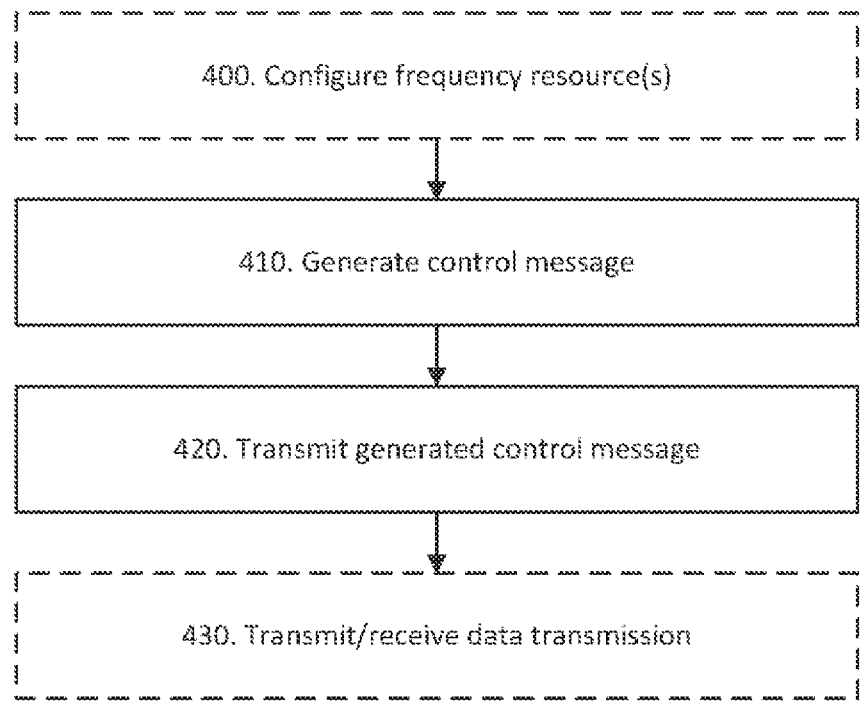
FIG. 9 is a flow chart illustrating a method which can be performed in a network node.

FIG. 9 is a flow chart illustrating a method which can be performed in a network node, such as access node/gNB 120 as described herein. The method can include:

Step 400: Optionally, the network node can configure a wireless device with a plurality of frequency resources. This can include transmitting configuration information via system broadcast, via RRC signaling, etc. The frequency resources can include one or more of: a carrier, a sub-band of a carrier, a set of resource blocks (RBs) on a carrier, a listen before talk (LBT) bandwidth, and a bandwidth part (BWP).

Step 410: Generating a control message. This can include one or more of generating/configuring/modifying/adding parameters or other information in a control message. The control message can include an indication of availability and/or unavailable frequency resource(s) for UL and/or DL transmission. In some embodiments, the control message can be a DCI message, such as a DCI format 2_0.

The control message can include at least one SFI field indicating a slot format for a corresponding frequency resource. The control message can include at least one frequency resource indicator indicating whether a corresponding frequency resource is available for operation (e.g. transmission/reception). In some embodiments, a frequency resource indicator can be associated with one or more SFIs.

Step 420: Transmitting the generated control message. The control message can be transmitted to one or more wireless devices, such as UE 110.

Step 430: The network node optionally transmits and/or receives data in accordance with the available frequency resource(s). This can include, for example, transmitting a CSI-RS on an available frequency resource to one or more wireless device(s).

It will be appreciated that one or more of the above steps can be performed simultaneously and/or in a different order. Also, steps illustrated in dashed lines are optional and can be omitted in some embodiments.

Figure 10:
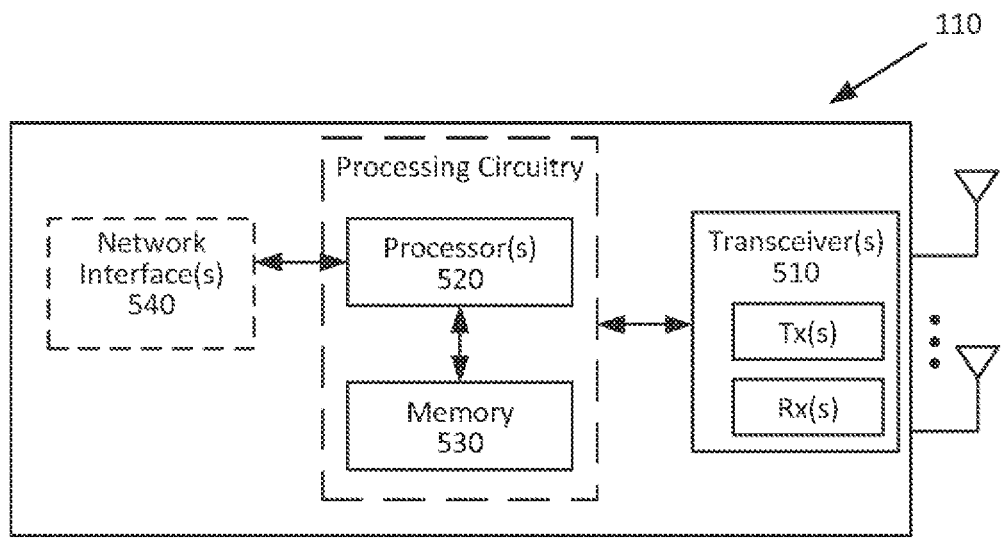
FIG. 10 is a block diagram of an example wireless device.

FIG. 10 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 5 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 11:
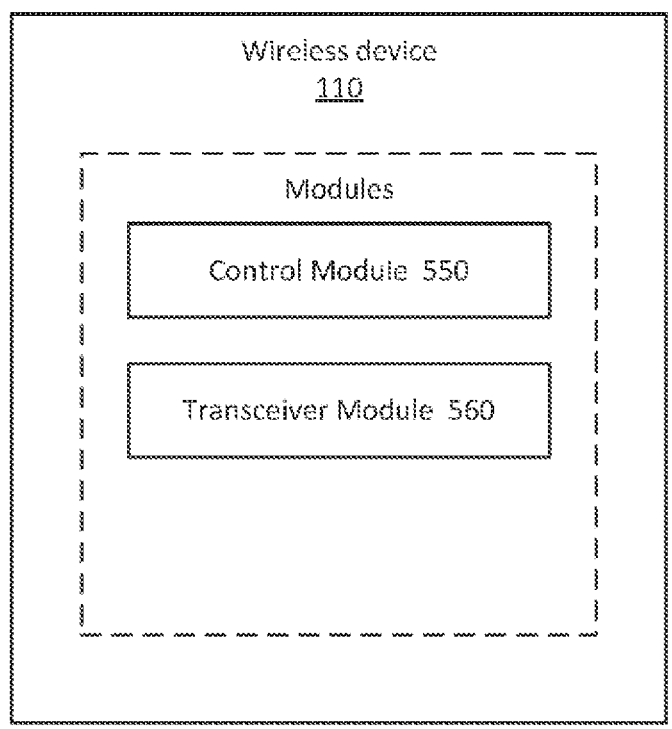
FIG. 11 is a block diagram of an example wireless device with modules.

In some embodiments, the wireless device UE 110 may comprise a series of modules configured to implement the functionalities of the wireless device described above. Referring to FIG. 11, in some embodiments, the wireless device 110 may comprise a control module 550 for receiving and interpreting control information and a transceiver module 560 for transmitting/receiving data transmissions in accordance with the control information.

It will be appreciated that the various modules may be implemented as combination of hardware and software, for instance, the processor, memory and transceiver(s) of UE 110 shown in FIG. 10. Some embodiments may also include additional modules to support additional and/or optional functionalities.

Figure 12:
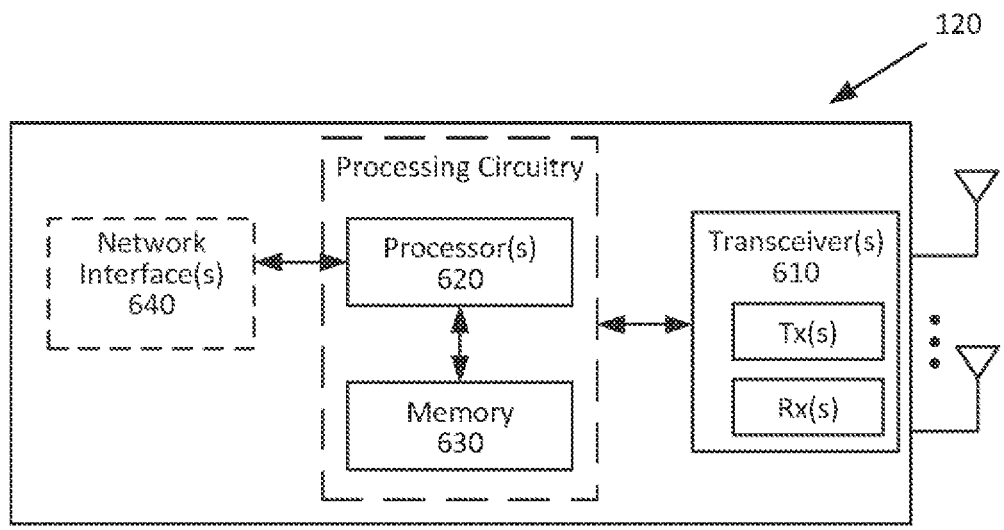
FIG. 12 is a block diagram of an example network node.

FIG. 12 is a block diagram of an exemplary network node, such as radio access node 120, in accordance with certain embodiments. Network node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of radio access node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 120 can include additional components beyond those shown in FIG. 12 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 12 may be included in other network nodes (such as UE 110, core network node 130, etc.). Other network nodes may optionally include or not include a wireless interface (such as the transceiver described in FIG. 12).

Figure 13:
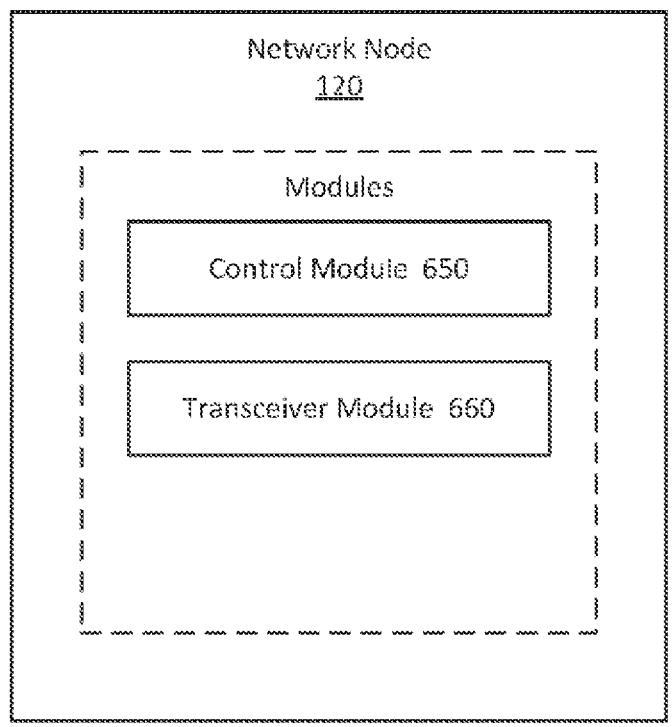
FIG. 13 is a block diagram of an example network node with modules.

In some embodiments, the network node 120, may comprise a series of modules configured to implement the functionalities of the network node described above. Referring to FIG. 13, in some embodiments, the network node 120 can comprise a control module 650 for generating and transmitting control information and a transceiver module 660 for transmitting/receiving data transmissions in accordance with the control information.

It will be appreciated that the various modules may be implemented as combination of hardware and software, for instance, the processor, memory and transceiver(s) of network node 120 shown in FIG. 12. Some embodiments may also include additional modules to support additional and/or optional functionalities.

Figure 14:
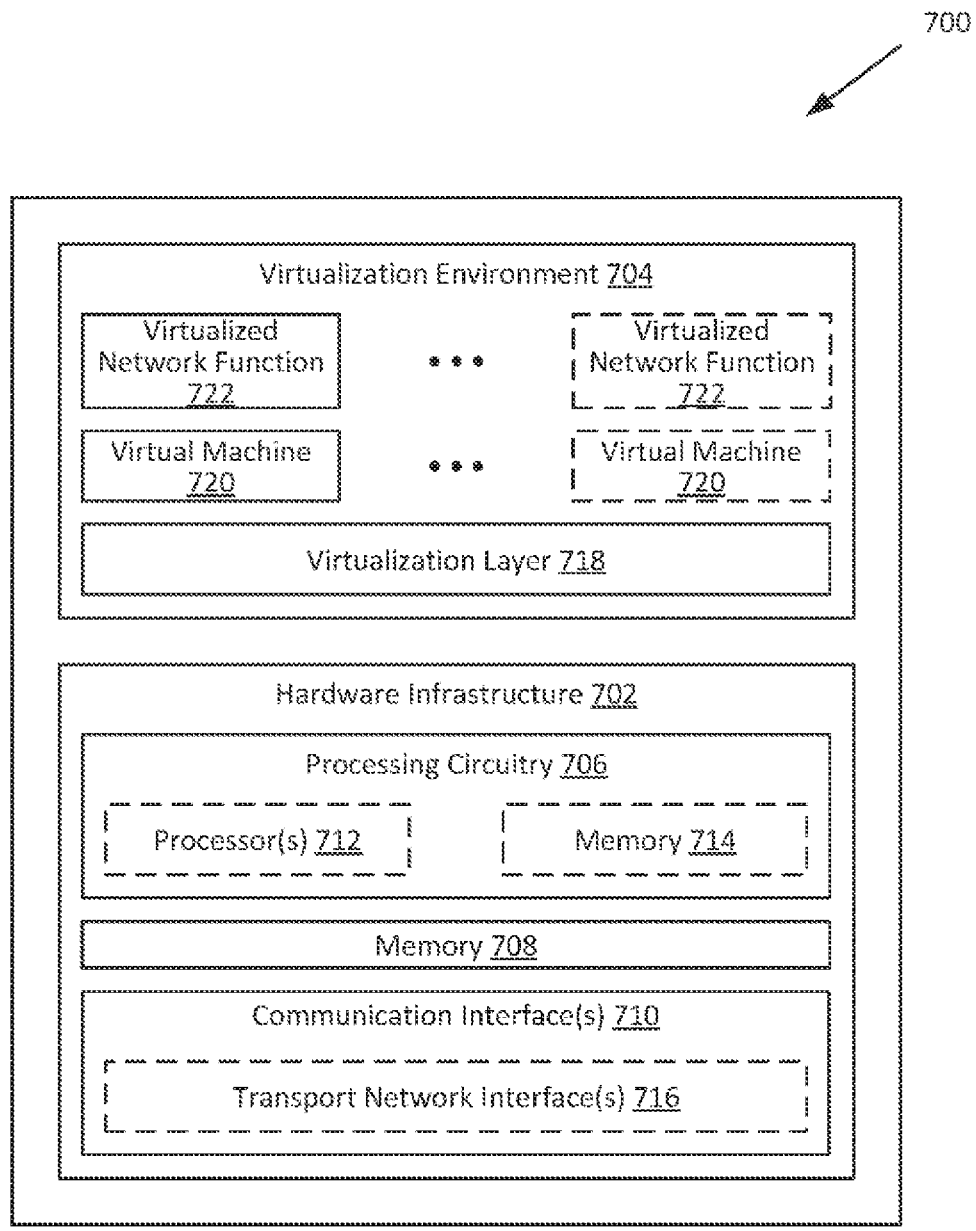
FIG. 14 is a block diagram of an example virtualized processing node.

Turning now to FIG. 14, some network nodes (e.g. UEs 110, radio access nodes 120, core network nodes 130, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuitry 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

GLOSSARY

The present description may comprise one or more of the following abbreviation:
3GPP Third Generation Partnership Project
ACK Acknowledgement
AP Access point
ARQ Automatic Repeat Request
BS Base Station
BSC Base station controller
BSR Buffer Status Report
BTS Base transceiver station
CA Carrier Aggregation
CC Component carrier
CCCH SDU Common Control Channel SDU
CG Cell group
CGI Cell Global Identifier
CN Core network
CQI Channel Quality information
CSI Channel State Information
CU Central Unit
DAS Distributed antenna system
DC Dual connectivity
DCCH Dedicated Control Channel
DCI Downlink Control Information
DL Downlink
DMRS Demodulation Reference Signal
DU Distributed Unit
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IAB Integrated Access Backhaul
IoT Internet of Things
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDCP Packet Data Convergence Protocol
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel RAT Radio Access Technology
RB Resource Block
RF Radio Frequency
RLC Radio Link Control
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a wireless device, comprising:
configuring the wireless device with a plurality of frequency resources;
receiving a downlink control information (DCI) message including at least one slot format indicator (SFI) field and a frequency resource indicator field, wherein the SFI indicates a slot format for a corresponding frequency resource, and the frequency resource indicator indicates whether the corresponding frequency resource is available for operation, and wherein the frequency resource indicator comprises a plurality of bits wherein each bit corresponds to one of the plurality of frequency resources; and
determining whether the corresponding frequency resource is available for operation in accordance with the frequency resource indicator.

2. The method of claim 1, wherein configuring the wireless device includes receiving configuration information from a network node.

3. The method of claim 1, wherein the plurality of frequency resources include one or more of: a carrier, a sub-band of a carrier, a set of resource blocks (RBs) on a carrier, a listen before talk (LBT) bandwidth, and a bandwidth part (BWP).

4. The method of claim 1, wherein the DCI message is a DCI format 2_0.

5. The method of claim 1, further comprising, determining whether the corresponding frequency resource is available for operation during a duration of the SFI in accordance with the frequency resource indicator.

6. The method of claim 1, wherein the DCI message further includes an associated channel occupancy time (COT) duration field.

7. The method of claim 6, further comprising, determining whether the corresponding frequency resource is available for operation during the COT duration in accordance with the frequency resource indicator.

8. The method of claim 1, wherein the wireless device identifies the corresponding frequency resource based at least in part on a bit position of the frequency resource indicator field in the received DCI message.

9. The method of claim 1, wherein, responsive to determining that the corresponding frequency resource is available for operation, the wireless device monitors the frequency resource.

10. The method of claim 9, wherein the wireless device monitors the frequency resource for a physical downlink control channel (PDCCH).

11. The method of claim 1, wherein, responsive to determining that the corresponding frequency resource is available for operation, the wireless device receives a channel-state information reference signal (CSI-RS) on the frequency resource.

12. The method of claim 1, wherein, responsive to determining that the corresponding frequency resource is not available for transmission/reception, the wireless device does not monitor the frequency resource.

13. The method of claim 1, further comprising:
determining that the SFI field corresponds to a reserved value in a frequency resource configuration; and
determining a number of slots for which the frequency resource is unavailable in accordance with the reserved value.

14. A method performed by a network node, comprising:
generating a downlink control information (DCI) message including at least one slot format indicator (SFI) field and a frequency resource indicator field, wherein the SFI indicates a slot format for a corresponding frequency resource, and the frequency resource indicator indicates whether the corresponding frequency resource is available for operation, and wherein the frequency resource indicator comprises a plurality of bits wherein each bit corresponds to one of the plurality of frequency resources; and
transmitting the generated DCI message to one or more wireless devices.

15. The method of claim 14, further comprising, configuring one or more wireless devices with a plurality of frequency resources.

16. The method of claim 15, wherein configuring the one or more wireless devices includes transmitting configuration information.

17. The method of claim 14, wherein the plurality of frequency resources include one or more of: a carrier, a sub-band of a carrier, a set of resource blocks (RBs) on a carrier, a listen before talk (LBT) bandwidth, and a bandwidth part (BWP).

18. The method of claim 14, wherein the DCI message is a DCI format 2_0.

19. The method of claim 14, wherein a bit position of the frequency resource indicator field in the received DCI message identifies a corresponding frequency resource.

20. The method of claim 14, further comprising, transmitting a channel-state information reference signal (CSI-RS) on an available frequency resource.

21. A wireless device comprising a radio interface and processing circuitry configured to:
   configure the wireless device with a plurality of frequency resources;
   receive a downlink control information (DCI) message including at least one slot format indicator (SFI) field and a frequency resource indicator field, wherein the SFI indicates a slot format for a corresponding frequency resource, and the frequency resource indicator indicates whether the corresponding frequency resource is available for operation, and wherein the frequency resource indicator comprises a plurality of bits wherein each bit corresponds to one of the plurality of frequency resources; and
   determine whether the corresponding frequency resource is available for operation in accordance with the frequency resource indicator.

22. The wireless device of claim 21, wherein configuring the wireless device includes receiving configuration information from a network node.

23. The wireless device of claim 21, wherein the plurality of frequency resources include one or more of: a carrier, a sub-band of a carrier, a set of resource blocks (RBs) on a carrier, a listen before talk (LBT) bandwidth, and a bandwidth part (BWP).

24. The wireless device of claim 21, wherein the DCI message is a DCI format 2_0.

25. The wireless device of claim 21, further configured to determine whether the corresponding frequency resource is available for operation during a duration of the SFI in accordance with the frequency resource indicator.

26. The wireless device of claim 21, wherein the DCI message further includes an associated channel occupancy time (COT) duration field.

27. The wireless device of claim 26, further configured to determine whether the corresponding frequency resource is available for operation during the COT duration in accordance with the frequency resource indicator.

28. The wireless device of claim 21, wherein the wireless device identifies the corresponding frequency resource based at least in part on a bit position of the frequency resource indicator field in the received DCI message.

29. The wireless device of claim 21, wherein, responsive to determining that the corresponding frequency resource is available for operation, the wireless device monitors the frequency resource.

30. The wireless device of claim 29, wherein the wireless device monitors the frequency resource for a physical downlink control channel (PDCCH).

31. The wireless device of claim 21, wherein, responsive to determining that the corresponding frequency resource is available for operation, the wireless device receives a channel-state information reference signal (CSI-RS) on the frequency resource.

32. The wireless device of claim 21, wherein, responsive to determining that the corresponding frequency resource is not available for transmission/reception, the wireless device does not monitor the frequency resource.

33. The wireless device of claim 21, further configured to:
   determine that the SFI field corresponds to a reserved value in a frequency resource configuration; and
   determine a number of slots for which the frequency resource is unavailable in accordance with the reserved value.

34. A network node comprising a radio interface and processing circuitry configured to:
   generate a downlink control information (DCI) message including at least one slot format indicator (SFI) field and a frequency resource indicator field, wherein the SFI indicates a slot format for a corresponding frequency resource, and the frequency resource indicator indicates whether the corresponding frequency resource is available for operation, and wherein the frequency resource indicator comprises a plurality of bits wherein each bit corresponds to one of the plurality of frequency resources; and
   transmit the generated DCI message to the one or more wireless devices.

* * * * *

UNITED STATES PATENT AND TRADEMARK OFFICE
CERTIFICATE OF CORRECTION

PATENT NO. : 12,167,455 B2
APPLICATION NO. : 17/635807
DATED : December 10, 2024
INVENTOR(S) : Shokri Razaghi et al.

Page 1 of 2

It is certified that error appears in the above-identified patent and that said Letters Patent is hereby corrected as shown below:

On the Title Page

In Item (72), under "Inventors", in Column 1, Line 2, delete "Lulea" and insert -- Luleå --, therefor.

In Item (72), under "Inventors", in Column 1, Line 5, delete "Taby" and insert -- Täby --, therefor.

In Item (56), under "OTHER PUBLICATIONS", in Column 2, Line 1, delete "(Sep. 2019)" and insert -- (Mar. 2019) --, therefor.

In the Specification

In Column 1, Line 18, delete "later" and insert -- latter --, therefor.

In Column 9, Line 61, delete "AP/STA))" and insert -- AP/STA) --, therefor.

In Column 13, Line 16, delete "equipped" and insert -- equipment --, therefor.

In Column 15, Line 55, delete "connected" and insert -- connected to --, therefor.

In Column 17, Line 18, delete "Reseved" and insert -- Reserved --, therefor.

In Column 23, Line 45, delete "and or" and insert -- and/or --, therefor.

In Column 26, Line 35, delete "and/or or" and insert -- and/or --, therefor.

In Column 27, Line 41, delete "and/or or" and insert -- and/or --, therefor.

In Column 30, Line 9, delete "Identifier" and insert -- Identity --, therefor.

Signed and Sealed this
Fourteenth Day of October, 2025

John A. Squires
*Director of the United States Patent and Trademark Office*

CERTIFICATE OF CORRECTION (continued)
U.S. Pat. No. 12,167,455 B2

In Column 30, Line 60, delete "Gateway" and insert -- Data Network Gateway --, therefor.

In Column 30, Line 62, delete "Precoder" and insert -- Precoding --, therefor.

In Column 31, Line 5, delete "Management" and insert -- Monitoring --, therefor.

In Column 31, Line 26, delete "Signal" and insert -- Signal to --, therefor.